United States Patent
Austin et al.

(10) Patent No.: US 10,336,921 B2
(45) Date of Patent: Jul. 2, 2019

(54) ADHESIVE COMPOSITIONS FOR NONWOVEN APPLICATIONS

(71) Applicant: ExxonMobil Chemical Patents Inc., Baytown, TX (US)

(72) Inventors: Jennifer J. Austin, The Woodlands, TX (US); Ranjan Tripathy, Sugar Land, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 24 days.

(21) Appl. No.: 15/123,263

(22) PCT Filed: Mar. 24, 2015

(86) PCT No.: PCT/US2015/022197
§ 371 (c)(1),
(2) Date: Sep. 2, 2016

(87) PCT Pub. No.: WO2015/164016
PCT Pub. Date: Oct. 29, 2015

(65) Prior Publication Data
US 2017/0058155 A1    Mar. 2, 2017

Related U.S. Application Data

(60) Provisional application No. 61/982,691, filed on Apr. 22, 2014.

(51) Int. Cl.
*C09J 123/16* (2006.01)
*C09J 123/06* (2006.01)
(Continued)

(52) U.S. Cl.
CPC .............. *C09J 123/16* (2013.01); *C08L 23/16* (2013.01); *C09J 123/06* (2013.01);
(Continued)

(58) Field of Classification Search
CPC ................ C08L 2205/025; C08L 23/16; C09J 123/0815; C09J 123/12; C09J 123/16; C09J 123/0185
See application file for complete search history.

(56) References Cited

U.S. PATENT DOCUMENTS 6,657,009 B2    12/2003    Zhou
6,774,069 B2    8/2004    Zhou et al.
(Continued)

FOREIGN PATENT DOCUMENTS

WO    2005/026282    3/2005
WO    2007/070091    6/2007
(Continued)

OTHER PUBLICATIONS

U.S. Appl. No. 61/892,826, filed Oct. 18, 2013, Schroeyers et al.

*Primary Examiner* — Satya B Sastri

(57) ABSTRACT

The present invention is related to a polymer blend, having a melt viscosity at 190° C. of 3,000 cP to 12,000 cP, and one or more tackifiers, having a softening point of 80° C. to 145° C., an aromaticity of 3 mol % to 11 mol % aromatic protons, and a Cloud Point of −10° C. to 15° C. for use in an adhesive composition. The polymer blend includes a first propylene-based polymer and a different second propylene-based polymer, both selected from a homopolymer of propylene or a copolymer of propylene and ethylene or a $C_4$ to $C_{10}$ alpha-olefin.

14 Claims, 1 Drawing Sheet

(51) Int. Cl.
  *C09J 123/08* (2006.01)
  *C09J 123/12* (2006.01)
  *C08L 23/16* (2006.01)

(52) U.S. Cl.
  CPC ... *C09J 123/0815* (2013.01); *C09J 123/0853* (2013.01); *C09J 123/12* (2013.01); C08L 2205/025 (2013.01)

(56) References Cited

U.S. PATENT DOCUMENTS

| | | | |
|---|---|---|---|
| 6,887,941 | B2 | 5/2005 | Zhou |
| 6,992,131 | B2 | 1/2006 | Faissat et al. |
| 7,199,180 | B1 | 4/2007 | Simmons et al. |
| 7,294,681 | B2 | 11/2007 | Jiang et al. |
| 7,524,910 | B2 | 4/2009 | Jiang et al. |
| 7,786,032 | B2 | 8/2010 | Zhou et al. |
| 8,038,661 | B2 | 10/2011 | Sue et al. |
| 8,430,856 | B2 | 4/2013 | Sue et al. |
| 8,487,026 | B2 | 7/2013 | Bach et al. |
| 2004/0127614 | A1 | 7/2004 | Jiang et al. |
| 2005/0054780 | A1* | 3/2005 | Zhou ............ B32B 7/12 525/240 |
| 2008/0009036 | A1 | 1/2008 | Lunnen et al. |
| 2009/0075540 | A1 | 3/2009 | Zhou et al. |
| 2012/0328805 | A1 | 12/2012 | Davis |
| 2012/0329350 | A1 | 12/2012 | Davis et al. |
| 2012/0329353 | A1 | 12/2012 | Davis et al. |
| 2012/0329929 | A1 | 12/2012 | Miller et al. |
| 2013/0005884 | A1 | 1/2013 | Davis et al. |
| 2013/0134038 | A1 | 5/2013 | Sato et al. |
| 2014/0080974 | A1 | 3/2014 | Jiang et al. |

FOREIGN PATENT DOCUMENTS

| | | |
|---|---|---|
| WO | 2008/063907 | 5/2008 |
| WO | 2012/129489 | 9/2012 |
| WO | 2014/014491 | 1/2014 |

* cited by examiner

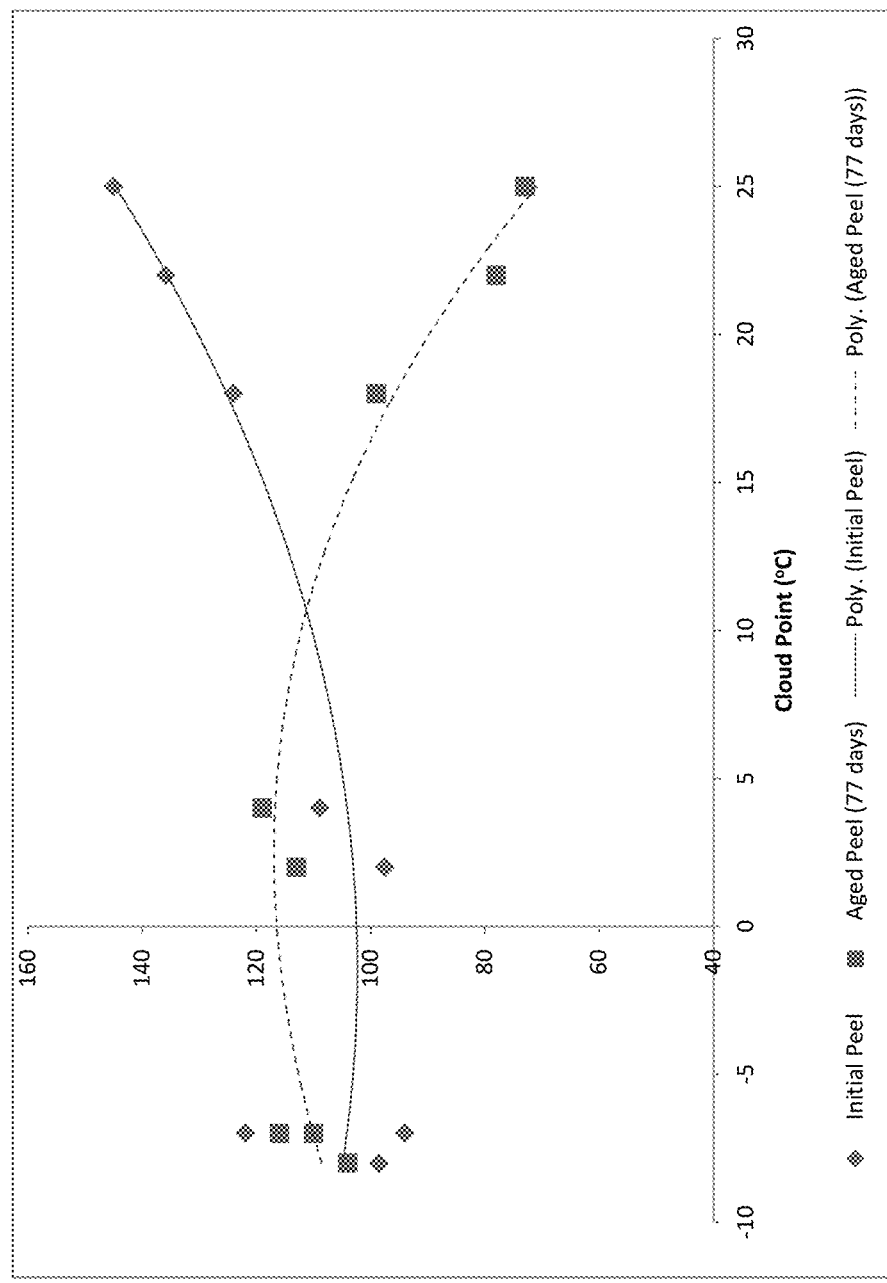

… (US 10,336,921 B2)

ADHESIVE COMPOSITIONS FOR NONWOVEN APPLICATIONS

CROSS REFERENCE TO RELATED APPLICATIONS

This present application is a National Stage Application of International Application No. PCT/US2015/022197, filed Mar. 24, 2015, which claims the benefit of Ser. No. 61/982,691, filed Apr. 22, 2014, the disclosure of which is incorporated by reference in its entirety.

FIELD OF INVENTION

The invention relates to a polyolefin adhesive composition comprising a high polymer load and one or more tackifiers.

BACKGROUND

Adhesive composition components such as base polymers, tackifiers, waxes, and oils are customarily provided as separate components for formulation into hot melt adhesive (HMA) compositions. HMA compositions for nonwoven applications are used for construction and lamination, e.g., to attach nonwoven and other components together and to adhere the layers of a material together. Nonwoven applications can include hygiene products such as baby diapers, adult diapers, incontinence products or devices, absorbent articles, panty liners, and sanitary napkins. In nonwoven applications, HMA compositions are sought that provide a desired combination of physical properties such as stable adhesion over time, indicative of broad application temperature ranges, and machine coatability. Machine coatability is a term well known in the art to refer to the robust application ability of an adhesive formulation on a substrate, via a machine, requiring only minimal adjustment of machine settings including machine speed and temperature. An adhesive formulation having good machine coatability can reduce time and therefore costs associated with the adhesive application process, because the adhesive formulation is versatile enough to be used on more than one machine without many adjustments of the machine settings. Poor machine coatability can result in web breaks of the adhesive formulation during application of the adhesive at starting and stopping intervals of the machine, which can unfavorably impact line efficiency, and also result in increased down time and high costs. HMAs having stable and consistent adhesion over broad application temperatures are also generally sought for nonwoven construction and lamination applications.

Exemplary base polymer compositions and methods of making polymer compositions for HMA applications are disclosed in U.S. Pat. Nos. 7,294,681 and 7,524,910. Various polymers described in these patents and/or produced by the methods disclosed in these patents have been sold by ExxonMobil Chemical Company as LINXAR™ polymers.

International Publication No. 2013/134038 discloses a method for producing a polymer blend having at least two different propylene-based polymers produced in parallel reactors. The multi-modal polymer blend has a Mw of about 10,000 g/mol to about 150,000 g/mol. U.S. Provisional Application No. 61/892,826, filed on Oct. 18, 2013, discloses an adhesive composition for nonwoven applications having 50-80 wt % of the polymer blend disclosed in International Publication No. 2013/134038 and any selection of tackifier.

Although many different types of polymers are known and have been used in HMA formulations, there remains a need for a tackified adhesive formulation that has high loading of the new base polymers to achieve equivalent or better adhesive performance attributes including stable adhesion over time indicative of broad application temperature ranges, and machine coatability, as compared to HMA formulations that are currently available.

SUMMARY

The foregoing and/or other challenges are addressed by the methods and products disclosed herein.

In one aspect, a polymer blend and one or more tackifiers is provided for use in an adhesive composition. The one or more tackifiers has a softening point, as determined by ASTM E-28 of about 80° C. to about 145° C., an aromaticity of about 3 mol % to about 11 mol % aromatic protons, and a Cloud Point of about −10° C. to about 15° C. The polymer blend includes a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer. The polymer blend has a melt viscosity, measured at 190° C. of about 3,000 cP to about 12,000 cP. The polymer blend is present in the amount of about 50 wt % to about 90 wt % of the adhesive composition.

These and other aspects of the present inventions are described in greater detail in the following detailed description and are illustrated in the accompanying figures and tables.

BRIEF DESCRIPTION OF THE DRAWING

FIG. 1 depicts the aged peel strength of adhesive formulations as a function of the Cloud Point of the one or more tackifiers of the formulation.

DETAILED DESCRIPTION

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

The inventors have discovered an adhesive composition utilizing a new polymer blend, such that the adhesive composition has stable adhesion over time, indicative of broad application temperature ranges, and machine coatability. While U.S. Provisional Application No. 61/892,826, filed on Oct. 18, 2013, discloses the use of tackifiers having certain softening point and aromaticty ranges to achieve favorable adhesive properties for nonwoven applications, the inventors have unexpectedly discovered that a narrow selection of those tackifiers, having a certain Cloud Point, can also effect the adhesive peel strength. The adhesive compositions described herein can be used in nonwoven construction/lamination and nonwoven elastic applications alike.

The inventive adhesives may be produced using a new process platform that is more robust and lacks many of the limitations and difficulties associated with the processes employed to make LINXAR™ polymers and those disclosed in U.S. Pat. Nos. 7,294,681 and 7,524,910. Advantageously, about 50 wt % to about 90 wt % of one or more polymer blends is used in adhesive formulations when the polymer blend has a melt viscosity of about 3,000 cP to about 12,000 cP.

Advantageously, polymers used in the adhesive composition can be produced using the new process platform that share many of the characteristics of the LINXAR™ polymers that make the LINXAR™ polymers excellent polymers for use in adhesive applications. New polymers can be produced using the new process platform that possess other characteristics that, although differentiate the polymers from the LINXAR™ polymers, are believed to contribute to the new polymers' excellent adhesive performance.

A. Methods of Preparing Polymer Blends and Compositions

A solution polymerization process for preparing polymer blends is generally performed by a system that includes a first reactor, a second reactor in parallel with the first reactor, a liquid-phase separator, a devolatilizing vessel, and a pelletizer. The first reactor and second reactor may be, for example, continuous stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, or octene. Generally, the choice of monomers and relative amounts of chosen monomers employed in the process depends on the desired properties of the first polymer and final polymer blend. For adhesive compositions, ethylene and hexene are particularly preferred comonomers for copolymerization with propylene. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

The second reactor may receive a third monomer feed of a third monomer, a fourth monomer feed of a fourth monomer, and a catalyst feed of a second catalyst. The second reactor may also receive feeds of a solvent and activator. The solvent and/or the activator feed may be combined with any of the third monomer feed, the fourth monomer feed, or second catalyst feed, or the solvent and activator may be supplied to the reactor in separate feed streams. A second polymer is produced in the second reactor and is evacuated from the second reactor via a second product stream. The second product stream comprises the second polymer, solvent, and any unreacted monomer.

In any embodiment, the third monomer may be propylene and the fourth monomer may be ethylene or a $C_4$ to $C_{10}$ olefin. In any embodiment, the fourth monomer may be ethylene, butene, hexene, or octene. In any embodiment, the relative amounts of propylene and comonomer supplied to the second reactor may be designed to produce a polymer that is predominantly propylene, i.e., a polymer that is more than 50 mol % propylene. In another embodiment, the second reactor may produce a homopolymer of propylene.

Preferably, the second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer. Specific examples of the types of polymers that may be combined to produce advantageous blends are described in greater detail herein.

It should be appreciated that any number of additional reactors may be employed to produce other polymers that may be integrated with (e.g., grafted) or blended with the first and second polymers. In any embodiment, a third reactor may produce a third polymer. The third reactor may be in parallel with the first reactor and second reactor or the third reactor may be in series with one of the first reactor and second reactor.

Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer blends, particularly in cases in which one of the polymers of the blend has a weight average molecular weight less than 100,000 g/mol, and even more particularly between 10,000 g/mol and 60,000 g/mol. The concentration of polymer in the polymer lean phase may be further reduced by catalyst selection. Catalysts of Formula I (described below), particularly dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl were found to be particularly effective catalysts for minimizing the concentration of polymer in the lean phase. Accordingly, in any embodiment, one, both, or all polymers may be produced using a catalyst of Formula I, particularly dimethylsilyl bis(2-methyl-4-phenylindenyl) zirconium dichloride, dimethylsilyl bis(2-methyl-4-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the multi-modal polymer blend and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the multi-modal polymer blend is then discharged through a pelletization die as formed pellets. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art.

International Publication No. 2013/134038 generally describes the method of preparing polyolefin adhesive components and compositions. The contents of International Publication No. 2013/134038 and its parent application U.S. Patent Application Ser. No. 61/609,020 filed Mar. 9, 2012, are both incorporated herein in their entirety.

B. Polymers

Preferred polymers are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. The term "polymer blend" as used herein includes, but is not limited to a blend of one or more polymers prepared in solution or by physical blending, such as melt blending.

"Propylene-based" or "predominantly propylene-based" as used herein, is meant to include any polymer comprising propylene, either alone or in combination with one or more comonomers, in which propylene is the major component (i.e., greater than 50 mol % propylene).

In any embodiment, one or more polymers of the blend may comprise one or more propylene-based polymers, which comprise propylene and from about 2 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more propylene-based polymers of the polymer blend may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers of the propylene-based polymer may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers of the propylene-based polymer may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the blend (as determined by DSC) may be less than about 130° C., or less than about 125° C., less than about 120° C., or less than about 115° C., or less than about 110° C., or less than about 100° C., or less than about 90° C., and greater than about 70° C., or greater than about 75° C., or greater than about 80° C., or greater than about 85° C. In any embodiment, the Tm of the one or more polymers of the blend may be greater than about 25° C., or greater than about 30° C., or greater than about 35° C., or greater than about 40° C. Tm of the polymer blend can be determined by taking 5 mg to 10 mg of a sample of the polymer blend, equilibrating a DSC Standard Cell FC at −90° C., ramping the temperature at a rate of 10° C. per minute up to 200° C., maintaining the temperature for 5 minutes, lowering the temperature at a rate of 10° C. per minute to −90° C., ramping the temperature at a rate of 10° C. per minute up to 200° C., maintaining the temperature for 5 minutes, and recording the temperature as Tm.

In one or more embodiments, the crystallization temperature (Tc) of the polymer blend (as determined by DSC) is less than about 110° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc of the polymer is greater than about 0° C., or greater than about 5° C., or greater than about 10° C., or greater than about 15° C., or greater than about 20° C. In any embodiment, the Tc lower limit of the polymer may be 0° C., 5° C., 10° C., 20° C., 30° C., 40° C., 50° C., 60° C., and 70° C.; and the Tc upper limit temperature may be 100° C., 90° C., 80° C., 70° C., 60° C., 50° C., 40° C., 30° C., 25° C., and 20° C. with ranges from any lower limit to any upper limit being contemplated.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65% of the crystallinity of isotactic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer can have a level of isotacticity expressed as percentage of isotactic triads (three consecutive propylene units), as measured by $^{13}$C NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Patent Application Publication No. 2004/0236042.

The semi-crystalline polymer may have a tacticity index m/r ranging from a lower limit of 4, or 6 to an upper limit of 10, or 20, or 25. The tacticity index, expressed herein as "m/r", is determined by $^{13}$C nuclear magnetic resonance ("NMR"). The tacticity index m/r is calculated as defined by H. N. Cheng in 17 MACROMOLECULES, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature and determined according to ASTM D-792. As used herein, the term "room temperature" is used to refer to the temperature range of about 20° C. to about 23.5° C.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_w$, molecular weight distribution (MWD) or $M_w/M_n$ where $M_n$ is the number-average molecular weight, and the branching index, g'(vis), are characterized using a High Temperature Size Exclusion Chromatograph (SEC), equipped with a Differential Refractive Index Detector (DRI), an Online Light Scattering Detector (LS), and a viscometer. Experimental details not shown below, including how the detectors are calibrated, are described in: T. Sun, P. Brant, R. R. Chance, and W. W. Graessley, Macromolecules, 2001, Volume 34, Number 19, pp. 6812-6820.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 mg/mL to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1-1.5 hr before running samples. As used herein, the term "room temperature" is used to refer to the temperature range of about 20° C. to about 23.5° C.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm³, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$[K_o c/\Delta R(\theta, c)] = [1/MP(\theta)] + 2A_2 c$$

where $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w \equiv \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n \equiv \Sigma x_i M_i = N_i M_i / \Sigma N_i$$

since the mole fraction $x_i$ is defined as $N_i$ divided by the total number of molecules $$x_i = N_i / \Sigma N_i$$

In the SEC, a high temperature Viscotek Corporation viscometer is used, which has four capillaries arranged in a Wheatstone Bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{k M_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v \equiv (\Sigma c_i M_i^\alpha / \Sigma c_i)^{1/\alpha}$$

In one or more embodiments, the semi-crystalline polymer may have a viscosity (also referred to a Brookfield viscosity or melt viscosity), measured at 190° C. and determined according to ASTM D-3236 from about 100 cP to about 500,000 cP, or from about 100 cP to about 100,000 cP, or from about 100 cP to about 50,000 cP, or from about 100 cP to about 25,000 cP, or from about 100 cP to about 15,000 cP, or from about 100 cP to about 10,000 cP, or from about 100 cP to about 5,000 cP, or from about 500 cP to about 15,000 cP, or from about 500 cP to about 10,000 cP, or from about 500 cP to about 5,000 cP, or from about 1,000 to about 10,000 cP, wherein 1 cP=1 mPa.sec.

In one or more embodiments, the semi-crystalline polymer may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the semi-crystalline polymer may be characterized by a viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP with ranges from any lower limit to any upper limit being contemplated.

The polymers that may be used in the adhesive compositions disclosed herein generally include any of the polymers according to the process disclosed in International Publication No. 2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences. The contents of International Publication No. 2013/134038 and its parent application U.S. Patent Application Serial No. 61/609,020 filed Mar. 9, 2012, are both incorporated herein in their entirety.

Polymers and blended polymer products are also provided. In any embodiment, one or more of the polymers described herein may be blended with another polymer, such as another polymer described herein, to produce a physical blend of polymers. The polymer blends used in the examples of the invention are listed in Table 1 and were generally produced in accordance with the method disclosed in International Publication No. 2013/134038. The present invention is not limited to those polymers disclosed in Table 1 or described herein.

In an embodiment, the adhesive composition of the present invention includes an ethylene-based polymer such as ethylene vinyl acetate and polyethylene/ethylene copolymers. In an embodiment, the ethylene vinyl acetate has 15 wt % to 40 wt % vinyl acetate and a melt index of 30 g/10 min to 1,000 g/10 min. Useful commercially available ethylene vinyl acetates are the Escorene™ grades available from ExxonMobil Chemical. In an embodiment, the polyethylene/ethylene copolymer has a density of about 0.86 g/cm$^3$ to 0.9 g/cm$^3$ and a viscosity of 5 Pa-s to 200 Pa-s at 177° C. Useful commercially available polyethylenes/ethylene copolymers are the AFFINITY™ grades available from Dow Chemical.

In an embodiment, the adhesive composition of the present invention includes a propylene-based homopolymer. In an embodiment, the homopolymer has a viscosity of 1,000 cP to 30,000 cP at 190° C. and a softening point, as determined by ISO4625, of 70° C. to 130° C. Useful commercially available propylene-based homopolymers are the L-MODU™ grades available from Idemitsu.

Catalysts/Activators

The polymer blends described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

In any embodiment, the catalyst systems used for producing semi-crystalline polymers may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si—, N— or P— containing alkyl or aryl. Each leaving group X may be an alkyl, preferably methyl, or a halide ion, preferably chloride or fluoride. Exemplary metallocene compounds of this type include, but are not limited to, µ-dimethylsilylbis(indenyl) hafnium dimethyl and µ-dimethylsilylbis(indenyl) zirconium dimethyl.

In any embodiment, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C, Si, or Ge, M is a Group 3, 4, 5, or 6 transition metal, and $X_2$ are leaving groups. $In^1$ and $In^2$ are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si—, N— or P— containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3,'5'-di-tert-butylphenyl)indenyl) zirconium dimethyl, (dimethylsilyl)bis(2-methyl-4-(3,'5'-di-tert-butylphenyl)indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethylsilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz (f)indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f) indenyl) zirconium dichloride, and cyclopropylsilyl bis(2-(methyl)-5,5,8,8-tetramethyl-5,6,7,8-tetrahydrobenz(f) indenyl) hafnium dimethyl.

In any embodiment, the activators of the catalyst systems used to produce semi-crystalline polymers may comprise a cationic component. In any embodiment, the cationic component may have the formula $[R^1R^2R^3AH]^+$, where A is nitrogen, $R^1$ and $R^2$ are together a —$(CH_2)_a$— group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

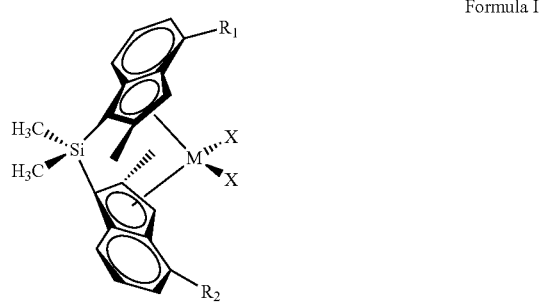

Formula I

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl) borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalyst. A particularly advantageous activator is dimethylaniliniumtetrakis(heptafluoronaphthyl) borate.

Suitable activators for the processes of the present invention also include aluminoxanes (or alumoxanes) and aluminum alkyls. Without being bound by theory, an alumoxane is typically believed to be an oligomeric aluminum compound represented by the general formula $(R^x—Al—O)_n$, which is a cyclic compound, or $R^x(R^x—Al—O)_nAlR^x_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In any embodiment, $R^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

Solvents

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt % to about 50 wt % solvent, or from about 5 wt % to about 45 wt % solvent, or from about 10 wt % to about 40 wt % solvent, or from about 10 wt % to about 35 wt % solvent.

International Publication No. 2013/134038 generally describes the catalysts, activators, and solvents used to prepare the polymer blend used in the adhesive compositions. The contents of International Publication No. 2013/134038 and its parent application U.S. Patent Application Serial No. 61/609,020 filed Mar. 9, 2012, are both incorporated herein in their entirety.

C. Tackifier

The term "tackifier" is used herein to refer to an agent that allows the polymer of the composition to be more adhesive by improving wetting during the application. Tackifiers may be produced from petroleum-derived hydrocarbons and monomers of feedstock including tall oil and other polyterpene or resin sources. Tackifying agents are added to give tack to the adhesive and also to modify viscosity. Tack is required in most adhesive formulations to allow for proper joining of articles prior to the HMA solidifying. As used herein, the term "tackifier" includes one or more tackifiers.

"Softening Point" is the temperature, measured in °C., at which a material will flow. Softening Point is determined by ASTM E-28, (Revision 1996). Softening Point of one or more tackifiers is calculated by formula I, as described by Fox. T. G., Flory, P. J. in Second-Order Transition Temperatures and Related Properties of Polystyrene, Journal of Applied Physics 21, 581-591 (1950).

$$\frac{1}{\text{Tackifier Blend Softening Point}} = \sum \left( \left( \frac{\text{Tackifier1 wt \%}}{\text{Tackifier1 Softening Point}} \right) + \left( \frac{\text{Tackifier2 wt \%}}{\text{Tackifier2 Softening Point}} \right) + \ldots \right) \quad (I)$$

"Aromaticity" is the integration of aromatic protons versus an internal standard (1, 2 dichloroethane) given as weight percent of equivalent styrene, (104 g/mol). Aromaticity is determined by $^1$HNMR spectroscopy and is measured in mol % of aromatic protons. Aromaticity of one or more tackifiers is calculated by formula II, as described by Fox. T. G., Flory, P. J. in Second-Order Transition Temperatures and Related Properties of Polystyrene, Journal of Applied Physics 21, 581-591 (1950).

Tackifier Blend Aromaticity=Σ((Tackifier1 wt %
  ×Tackifier1 Aromaticity)+(Tackifier2 wt %
  ×Tackifier2 Aromaticity)+. . . )    (II)

"Cloud Point" of the one or more tackifiers is the temperature at which one or more tackifiers, dissolved in particular solvent, is no longer completely soluble (as determined by a cloudy appearance of the tackifier/solvent mixture). The method used to determine the cloud point in the present invention is as follows. Prepare a cooling bath of dry ice/isopropanol slurry in a 500 mL beaker, stir the slurry, and allow the temperature to stabilize for at least 2 minutes. Weigh 1.3 g of one or more tackifiers and add 20 mL of a solvent of 5 mL methyl-isobutyl ketone, 10 mL heptane, and 5 mL of methyl-ethyl ketone into a vial/test tube. Seal the vial/test tube and mix thoroughly. Check that all of the tackifier is dissolved into the solvent mixture and forms a uniform solution (e.g., by a clear and homogeneous appearance). If the tackifier/solvent mixture does not form a uniform solution (e.g., appears to be in two phases or opaque or is cloudy), then the Cloud Point is not achievable with this method. After obtaining a tackifier/solvent mixture that is a uniform solution, insert a thermometer into the test tube to gently stir the contents, thereby minimizing temperature gradient inside the tube. Submerge the test tube in the cooling bath allowing exposure to the bath for no more than 2 seconds at a time, such that the rate of cooling of the test tube contents does not exceed 5° C./min. The endpoint of the test method (reported as the Cloud Point) is reached when the red bulb of the thermometer is no longer visible, under room lighting, when held in the solution against the back wall of the test tube. The thermometer used in this test method is ASTM 6C, 76 mm immersion type, red bulb with −80° C. to +20° C. with 1° C. subdivisions.

Table 2 shows properties of the tackifiers used in the Examples. In embodiments, other tackifiers may be used with the polymer blends of the invention including, but not limited to, alkylphenolic, coumarone indene, other hydrogenated or non-hydrogenated hydrocarbon resins, hydroxylated polyester resin, phenolic, pure monomer styrene, resin dispersion, rosin ester, rosin, terpene tackifiers, and combinations thereof.

D. Additives: Plasticizer, Antioxidant

The HMA composition can include other additives, e.g., plasticizers, antioxidants, and combinations thereof either alone or in combination with one or more tackifiers disclosed herein.

The term "plasticizer" is used herein to refer to a substance that improves the fluidity of a material. A useful commercial available plasticizer is Krystol™ 550, a white oil available from Petro-Canada Lubricants. The invention is not limited to Krystol™ 550 as the plasticizer.

The term "antioxidant" is used herein to refer to high molecular weight hindered phenols and multifunctional phenols. A useful commercially available antioxidant is Irganox™ 1010, a hindered phenolic antioxidant available from BASF SE Corporation. The invention is not limited to Irganox 1010 as the antioxidant. In embodiments, other antioxidants that may be used with the polymer blends of the invention, including, but are not limited to amines, hydroquinones, phenolics, phosphites, and thioester antioxidants.

The term "wax" is used herein to refer to a substance that adjusts the overall viscosity of the adhesive composition. The primary function of wax is to control the set time and cohesion of the adhesive system. In embodiments, the adhesive composition is substantially free of wax.

E. Applications of Polyolefin Adhesive Compositions

The adhesive formulations disclosed herein can be used in various nonwoven construction applications including, but not limited to, hygiene products such as baby diapers, adult diapers, incontinence products or devices, absorbent articles, panty liners, and sanitary napkins. The adhesive formulations disclosed herein can also be used in various nonwoven elastic applications including, but not limited to, hygiene products such as wound care dressings for human or veterinary medicine. As the hygiene industry is continuing to move to products, articles, and devices with thinner gauge films and thinner nonwoven materials, the industry is continuing to seek adhesive formulations that can be applied over a broad application temperature range, for versatility of an adhesive formulation in more than one end use product, article, device, and combinations thereof. The adhesive formulations described herein, having a high polymer load, provide a desired combination of physical properties such as stable adhesion over time indicative of broad application temperature ranges and machine coatability and therefore can be used in nonwoven applications including hygiene products disclosed herein. It should be appreciated that the adhesive formulations of the present disclosure, while being well suited for use in hygiene nonwoven products, may also find utility in other applications as well.

In embodiments, one or more adhesive formulations can be used in baby or adult diapers, incontinence product, or training pants. One or more adhesive formulations disclosed herein may be used alone or in combination with other additives for affixing and or securing different layers or different components of a disposable diaper, incontinence product, or training pant construction. The construction of a diaper, incontinence product, or training pant can be accomplished in any conventional manner known in the art.

In a common construction, a diaper, incontinence product, or training pant includes a pant body having a front section, a back section, a crotch section, two elastic sections each having a front elastic member and a back elastic member, two leg openings and a waist opening, a backsheet and a topsheet, a waistband and two leg bands, a waistborder and two leg borders, an absorbent article, and optionally a fastening device having a quick-remove peelable layer on the fastening device when the diaper, incontinence product, or training pant is not in use. Certain non-limiting examples of using one or more adhesive formulations of the present disclosure in a diaper, incontinence product, or training pant include attaching the sides of the front section to the back section, attaching the crotch section to the front section and the back section, attaching the topsheet to the front layer, attaching the backsheet to the back layer, attaching the absorbent article to the crotch section, attaching each of the leg bands to each of the leg openings of the topsheet and backsheet, attaching each of the leg borders to each of the leg bands, attaching the waistband to the top section of the top sheet and the top section of the backsheet, attaching the waistborder to the waistband, attaching the quick-remove peelable layer to the fastening device, and attaching the fastening device to the waistborder.

In embodiments, one or more adhesive formulations can be used in sanitary napkins or panty liners. As used herein, the term "sanitary napkin" refers to an externally positioned, disposable absorbent article in the form of a catamenial device, configured for the absorption of body fluids such as menses. As used herein, the term "panty liner" refers to an externally positioned, disposable absorbent article having a thinner gauge and a narrower width than a sanitary napkin that can be configured for the absorption of body fluids. The construction of a sanitary napkin or panty liner can be accomplished in any conventional manner known in the art.

In a common construction, a sanitary napkin or panty liner includes a front body having an absorbent article, back body to be positioned on the undergarment of the wearer, a quick-remove peelable protectable layer covering the back body when the sanitary napkin or panty liner is not in use, optionally two side wing projections on either side of the front body and a quick-remove peelable protective layer covering each of the two side wing projections when the sanitary napkin or panty liner is not in use. Certain non-limiting examples of using one or more adhesive formulations of the present disclosure in a sanitary napkin or panty liner include attaching an absorbent article to the front body, attaching the front body to the back body, attaching a quick-remove peelable protective layer to the back body, attaching the two side wing projections on the front body, and attaching a quick-remove peelable protective layer to each of the two side wing projections on the front body.

In embodiments, one or more adhesive formulations can be used in a wound care dressing for human or veterinary medicine. As used herein, the term "wound care dressing" refers to wet, dry, or a combination of wet and dry, gauze used at or around a wound site to help wound healing. The construction of a wound care dressing can be accomplished in any conventional manner known in the art. In a common construction, a wound care dressing includes a top layer that is visible to the patient and a bottom layer that is in contact with the wound, an absorbent article, an adhesive coating the bottom layer, and a quick-remove peelable protective layer covering the bottom layer when the wound care dressing is not in use. Certain non-limiting examples of using one or more adhesive formulations of the present disclosure in a wound care dressing include attaching an absorbent article to the bottom layer, attaching the bottom layer to the top layer, attaching the quick-remove peelable protective layer to the bottom layer, and attaching the adhesive coating to the bottom layer.

EXAMPLES

"Peel" or "Peel Strength" is a measure of the average force to pull apart two bonded materials, measured in grams. Peel is tested in a T-Peel fashion on a slip/peel tester from IMASS Inc. at 12 in/min, as determined by ASTM D-903. Initial Peel measured in the examples of the invention is the peel strength of the adhesive formulation at room temperature, coated at 140° C., and aged for less than 10 minutes. Final Peel measured in the examples of the invention is the peel strength of the adhesive formulation at room temperature, coated at 140° C., and aged for 77 days. Delta Peel is the absolute value of the change in peel strength of the Final Peel and the Initial Peel. For nonwoven applications, a low Delta Peel indicates relatively stable peel strength of the adhesive formulation, such that the adhesive has a broad application temperature window for use in a wide range of nonwoven products. As used herein, the term "room temperature" is used to refer to the temperature range of about 20° C. to about 23.5° C.

"Failure Mode" is used to describe the location of the adhesive once a peel or delamination test is performed.

To apply the adhesive to the substrate, one or more polymer blends, optionally with other additives, including one or more tackifiers, one or more plasticizers, and one or more antioxidants, is preheated at the application temperature until the polymer is molten. The molten material is poured into a hot melt tank and allowed to equilibrate. The pump speed is set and the add-on is calculated based on the amount of adhesive that passes through the nozzle in a given time.

In a pilot plant, propylene-ethylene copolymers are produced by reacting a feed stream of propylene with a feed stream of ethylene in the presence of a metallocene catalyst. Table 1 shows properties of polymer blends used in the examples, and these polymer blends are generally produced in accordance with the method disclosed in International Publication No. 2013/134038. The adhesive blends presented in the Tables below are prepared by preheating the one or more tackifiers, plasticizers, and an antioxidant to 177° C. One or more polymer blends is slowly added in a heated mantle at 177° C. to the molten liquid of tackifier, plasticizer, and antioxidant until all of the polymer has been added and is completed blended. The components are blended by manual stirring using a spatula until all polymer pellets are melted and the mixture is homogeneous. The components are stirred for an additional 10 minutes. The adhesive blend is removed from the heating mantle, and poured onto release paper. After the adhesive blend solidifies, it is cut into small pieces for testing.

The comparative example (referred to herein as Comparative) is the commercially available premium grade of hot melt adhesives used for nonwoven applications by H. B. Fuller: D3166.

Table 1 lists the polymer blend used in the examples of the invention. The term "Bi-modal" as used in Table 1 is used to refer to polymer or polymer blend which has more than one compositional peak when measured by GPC. The invention is not limited to the polymer blends disclosed in Table 1.

Table 2 lists the tackifiers used in the examples of the invention. The invention is not limited to the tackifiers disclosed in Table 2.

Table 3 shows the effect of the softening point of the tackifier blend on the adhesive peel strength (initial, final, and delta) for 17 adhesive formulations. All 17 adhesive formulations, 1A to 17A, contain different blends of tackifiers and polymers, totaling 40 wt % of the formulation. The tackifier blends have the same aromaticity but have different softening points. The Delta Peel of the formulation changes with the tackifier blend and the base polymer. Generally, as the softening point increases, the initial peel increases. Table 3 shows that the softening point of the one or more tackifiers, according to the invention, is from about 85 to about 140° C.

Table 4 shows the effect of aromaticity on the adhesive peel strength (initial, final, and delta) for 5 adhesive formulations. All 5 adhesive formulations, 1B to 5B, contain different blends of tackifiers, totaling 40 wt % of the formulation. The tackifier blends have the same softening point but have different aromaticity. Generally, as the aromaticity increases, the initial peel increases. Table 4 shows that the aromaticity of the one or more tackifiers, according to the invention, is from about 3mol % to about 9 mol % aromatic protons.

Table 5 shows the effect of the Cloud Point of the tackifier blend on the adhesive peel strength (initial, final, and delta) for 12 adhesive formulations. Generally, formulations having Polymer Blend B display favorably smaller Delta Peel values than those having Polymer Blend A or Polymer Blend C. Formulations 1D-8D of Table 6 are evaluated in FIG. 1.

Table 6 shows the effect of the adhesive viscosity, measured at different temperatures, on the adhesive peel strength (initial, final, and delta) for an adhesive formulation of the present invention and for the Comparative D3166. The Comparative formulation shows decreasing initial peel as the viscosity of the formulation increases, by way of lower temperatures. In contrast, the inventive formulation show relatively stable initial peels as the viscosity of the formulation increases, by way of lower temperatures. The Delta Peel values of the inventive formulation are comparable to that of the Comparative formulation at 120° C. and are lower than those of the Comparative formulation at 140° C. and 160° C. The relatively stable peel strength of the inventive adhesive formulation over 120-160° C. demonstrates that it can be used in a broader application temperature window, for use in a wide range of nonwoven products including construction/laminated nonwovens and elastic nonwovens, as compared to the Comparative which would be limited to higher application temperature uses.

FIG. 1 depicts the aged peel strength of adhesive formulations as a function of the Cloud Point of the one or more tackifiers of the formulations 1D-8D of Table 5. Preferable tackifiers for the present invention have stable peel over time for use in nonwoven applications. FIG. 1 indicates that the preferred blend of tackifiers for the invention have a Cloud Point of −10 to about 15° C. Where one or more tackifiers has a Cloud Point above 15° C., the change in peel over time unfavorable increases.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

TABLE 1

| Polymer Blend | Viscosity at 190° C., cP | DSC Crystallinity, dH, J/g | Shore Hardness C | Ethylene Content, % | DSC Melting Point, ° C. | Bi-modal |
|---|---|---|---|---|---|---|
| A | 11,550 | 12.9 | 23 | 12.3 | 64.6 | yes |
| B | 8,000 | 23.1 | 21 | 12.4 | 100.7 | yes |
| C | 3,087 | 26.2 | 22 | 10.5 | 100.9 | yes |

TABLE 2

| Tackifier | Description | Source |
|---|---|---|
| Escorez ™ 5320 | Water white cycloaliphatic hydrocarbon resin having Softening Point of 124° C. | ExxonMobil Chemical |
| Escorez ™ 5340 | Water white cycloaliphatic hydrocarbon resin having Softening Point of 139.5° C. | ExxonMobil Chemical |

TABLE 2-continued

| Tackifier | Description | Source |
|---|---|---|
| Escorez ™ 5380 | Water white cycloaliphatic hydrocarbon resin having Softening Point of 86.2° C. | ExxonMobil Chemical |
| Escorez ™ 5400 | Light color cycloaliphatic hydrocarbon resin having Softening Point of 103.4° C. | ExxonMobil Chemical |
| Escorez ™ 5415 | Light color cycloaliphatic hydrocarbon resin having Softening Point of 118.3° C. | ExxonMobil Chemical |
| Escorez ™ 5600 | Light color aromatic modified, cycloaliphatic hydrocarbon resin having Softening Point of 102.5° C. and Aromaticity of 9.8 wt % aromatic protons. | ExxonMobil Chemical |
| Escorez ™ 5615 | Light color aromatic modified cycloaliphatic hydrocarbon resin having Softening Point of 117.8° C. and Aromaticity of 9.9 wt % aromatic protons. | ExxonMobil Chemical |
| Escorez ™ 5637 | Light color aromatic modified cycloaliphatic hydrocarbon resin having Softening Point of 129.5° C. and Aromaticity of 5.2 wt % aromatic protons. | ExxonMobil Chemical |
| Escorez ™ 5690 | Aromatic modified cycloaliphatic hydrocarbon resin having Softening Point of 90.5° C. and Aromaticity of 10.1 wt % aromatic protons. | ExxonMobil Chemical |
| Oppera ™ PR 100N | Water White fully hydrogenated cycloaliphatic hydrocarbon resin having softening point of 138° C. | ExxonMobil Chemical |

TABLE 3

| | Adhesive Formulation (wt % of the Adhesive) | | Softening Point, (° C.) | Initial Peel, (g) | Final Peel, (g) | Delta Peel, (g) |
|---|---|---|---|---|---|---|
| 1A | 50 | Polymer Blend B | 132 | 199 | 104 | 95 |
| | 10 | Krystol ™ 550 | | | | |
| | 6 | Escorez ™ 5400 | | | | |
| | 34 | Escorez ™ 5340 | | | | |
| | 0.2 | Irganox ™ 1010 | | | | |
| 2A | 50 | Polymer Blend B | 125 | 134 | 84 | 50 |
| | 10 | Krystol ™ 550 | | | | |
| | 8 | Escorez ™ 5400 | | | | |
| | 16 | Escorez ™ 5320 | | | | |
| | 16 | Escorez ™ 5340 | | | | |
| | 0.2 | Irganox ™ 1010 | | | | |
| 3A | 50 | Polymer Blend B | 119 | 112 | 61 | 51 |
| | 10 | Krystol ™ 550 | | | | |
| | 10 | Escorez ™ 5400 | | | | |
| | 30 | Escorez ™ 5320 | | | | |
| | 0.2 | Irganox ™ 1010 | | | | |
| 4A | 50 | Polymer Blend B | 110 | 114 | 115 | 1 |
| | 10 | Krystol ™ 550 | | | | |
| | 24 | Escorez ™ 5400 | | | | |
| | 16 | Escorez ™ 5320 | | | | |
| | 0.2 | Irganox ™ 1010 | | | | |
| 5A | 50 | Polymer Blend B | 103 | 109 | 119 | 10 |
| | 10 | Krystol ™ 550 | | | | |
| | 40 | Escorez ™ 5400 | | | | |
| | 0.2 | Irganox ™ 1010 | | | | |
| 6A | 50 | Polymer Blend B | 87 | 95 | 116 | 21 |
| | 10 | Krystol ™ 550 | | | | |
| | 40 | Escorez ™ 5380 | | | | |
| | 0.2 | Irganox ™ 1010 | | | | |
| 7A | 50 | Polymer Blend B | 129 | 129 | 78 | 51 |
| | 10 | Krystol ™ 550 | | | | |
| | 4 | Escorez ™ 5380 | | | | |
| | 4 | Escorez ™ 5320 | | | | |
| | 8 | Escorez ™ 5340 | | | | |
| | 24 | Oppera ™ PR100N | | | | |
| | 0.2 | Irganox ™ 1010 | | | | |
| 8A | 50 | Polymer Blend B | 138 | 115 | 46 | 69 |
| | 10 | Krystol ™ 550 | | | | |
| | 40 | Oppera ™ PR100N | | | | |
| | 0.2 | Irganox ™ 1010 | | | | |
| 9A | 50 | Polymer Blend B | 137 | 104 | 50 | 54 |
| | 10 | Krystol ™ 550 | | | | |
| | 32 | Escorez ™ 5340 | | | | |
| | 8 | Oppera ™ PR100N | | | | |
| | 0.2 | Irganox ™ 1010 | | | | |
| 10A | 50 | Polymer Blend B | 131 | 120 | 66 | 86 |
| | 10 | Krystol ™ 550 | | | | |
| | 20 | Escorez ™ 5320 | | | | |
| | 10 | Escorez ™ 5340 | | | | |
| | 10 | Oppera ™ PR100N | | | | |
| | 0.2 | Irganox ™ 1010 | | | | |
| 11A | 50 | Polymer Blend B | 140 | 106 | 30 | 76 |
| | 10 | Krystol ™ 550 | | | | |
| | 40 | Escorez ™ 5340 | | | | |
| | 0.2 | Irganox ™ 1010 | | | | |
| 12A | 50 | Polymer Blend A | 137 | 69 | 30 | 39 |
| | 10 | Krystol ™ 550 | | | | |
| | 32 | Escorez ™ 5340 | | | | |
| | 8 | Oppera ™ PR100N | | | | |
| | 0.2 | Irganox ™ 1010 | | | | |
| 13A | 50 | Polymer Blend A | 140 | 75 | 29 | 46 |
| | 10 | Krystol ™ 550 | | | | |
| | 40 | Escorez ™ 5340 | | | | |
| | 0.2 | Irganox ™ 1010 | | | | |
| 14A | 50 | Polymer Blend A | 138 | 77 | 52 | 25 |
| | 10 | Krystol ™ 550 | | | | |
| | 40 | Oppera ™ PR100N | | | | |
| | 0.2 | Irganox ™ 1010 | | | | |
| 15A | 50 | Polymer Blend C | 137 | 105 | 109 (after 24 hrs) | 4 |
| | 10 | Krystol ™ 550 | | | | |
| | 32 | Escorez ™ 5340 | | | | |
| | 8 | Oppera ™ PR100N | | | | |
| | 0.2 | Irganox ™ 1010 | | | | |
| 16A | 50 | Polymer Blend C | 140 | 66 | 51 (after 24 hrs) | 15 |
| | 10 | Krystol ™ 550 | | | | |
| | 40 | Escorez ™ 5340 | | | | |
| | 0.2 | Irganox ™ 1010 | | | | |
| 17A | 50 | Polymer Blend C | 138 | 95 | 65 (after 24 hrs) | 30 |
| | 10 | Krystol ™ 550 | | | | |
| | 40 | Oppera ™ PR100N | | | | |
| | 0.2 | Irganox ™ 1010 | | | | |

TABLE 4

| | Adhesive Formulation (wt % of the Adhesive) | | Aromaticity, (mol %) | Initial Peel, (g) | Final Peel, (g) | Delta Peel, (g) |
|---|---|---|---|---|---|---|
| 1B | 50 | Polymer Blend B | 2.9 | 109 | 93 | 16 |
| | 10 | Krystol ™ 550 | | | | |
| | 12 | Escorez ™ 5400 | | | | |
| | 10 | Escorez ™ 5320 | | | | |
| | 2 | Escorez ™ 5415 | | | | |
| | 4 | Escorez ™ 5690 | | | | |
| | 12 | Escorez ™ 5637 | | | | |
| | 0.2 | Irganox ™ 1010 | | | | |
| 2B | 50 | Polymer Blend B | 7.4 | 121 | 114 | 7 |
| | 10 | Krystol ™ 550 | | | | |
| | 6 | Escorez ™ 5690 | | | | |
| | 18 | Escorez ™ 5615 | | | | |
| | 10 | Escorez ™ 5637 | | | | |
| | 6 | Escorez ™ 5380 | | | | |
| | 0.2 | Irganox ™ 1010 | | | | |
| 3B | 50 | Polymer Blend B | 6.9 | 116 | 98 | 18 |
| | 10 | Krystol ™ 550 | | | | |
| | 4 | Escorez ™ 5415 | | | | |
| | 16 | Escorez ™ 5637 | | | | |
| | 20 | Escorez ™ 5600 | | | | |
| | 0.2 | Irganox ™ 1010 | | | | |
| 4B | 50 | Polymer Blend B | 0.5 | 97.5 | 78 | 19.5 |
| | 10 | Krystol ™ 550 | | | | |
| | 16 | Escorez ™ 5400 | | | | |
| | 8 | Escorez ™ 5320 | | | | |
| | 8 | Escorez ™ 5340 | | | | |
| | 8 | Escorez ™ 5415 | | | | |
| | 0.2 | Irganox ™ 1010 | | | | |
| 5B | 50 | Polymer Blend B | 8.5 | 96 | 90 | 6 |
| | 10 | Krystol ™ 550 | | | | |
| | 10 | Escorez ™ 5690 | | | | |
| | 24 | Escorez ™ 5615 | | | | |
| | 6 | Oppera ™ PR100N | | | | |
| | 0.2 | Irganox ™ 1010 | | | | |

TABLE 5

| | Adhesive Formulation (wt % Adhesive) | | Softening Point, (° C.) | Cloud Point, (° C.) | Initial Peel, (g) | Final Peel, (g) | Delta Peel, (g) |
|---|---|---|---|---|---|---|---|
| 1D | 50 | Polymer Blend B | 104 | −7 | 122 | 110 | 12 |
| | 10 | Krystol ™ 550 | | | | | |
| | 14 | Escorez ™ 5380 | | | | | |
| | 14 | Escorez ™ 5400 | | | | | |
| | 12 | Oppera ™ PR 100N | | | | | |
| | 0.2 | Irganox ™1010 | | | | | |
| 2D | 50 | Polymer Blend B | 111 | −8 | 99 | 104 | 5 |
| | 10 | Krystol ™ 550 | | | | | |
| | 16 | Escorez ™ 5380 | | | | | |
| | 24 | Oppera ™ PR 100N | | | | | |
| | 0.2 | Irganox ™1010 | | | | | |
| 3D | 50 | Polymer Blend B | 87 | −7 | 94 | 116 | 22 |
| | 10 | Krystol ™ 550 | | | | | |
| | 40 | Escorez ™ 5380 | | | | | |
| | 0.2 | Irganox ™1010 | | | | | |
| 4D | 50 | Polymer Blend B | 104 | 2 | 98 | 113 | 15 |
| | 10 | Krystol ™ 550 | | | | | |
| | 8 | Escorez ™ 5380 | | | | | |
| | 24 | Escorez ™ 5400 | | | | | |
| | 8 | Oppera ™ PR 100N | | | | | |
| | 0.2 | Irganox ™1010 | | | | | |
| 5D | 50 | Polymer Blend B | 103 | 4 | 109 | 119 | 10 |
| | 10 | Krystol ™ 550 | | | | | |
| | 40 | Escorez ™ 5400 | | | | | |
| | 0.2 | Irganox ™1010 | | | | | |
| 6D | 50 | Polymer Blend B | 108 | 18 | 124 | 99 | 25 |
| | 10 | Krystol ™ 550 | | | | | |
| | 28 | Escorez ™ 5400 | | | | | |
| | 12 | Escorez ™ 5320 | | | | | |
| | 0.2 | Irganox ™1010 | | | | | |
| 7D | 45 | Polymer Blend B | 108 | 22 | 136 | 78 | 58 |
| | 10 | Krystol ™ 550 | | | | | |
| | 32 | Escorez ™ 5400 | | | | | |
| | 13 | Escorez ™ 5320 | | | | | |
| | 0.2 | Irganox ™1010 | | | | | |
| 8D | 50 | Polymer Blend B | 122 | 25 | 145 | 73 | 72 |
| | 10 | Krystol ™ 550 | | | | | |
| | 4 | Escorez ™ 5400 | | | | | |
| | 36 | Escorez ™ 5320 | | | | | |
| | 0.2 | Irganox ™1010 | | | | | |
| 9D | 50 | Polymer Blend A | 104 | 2 | 65 | 86 | 21 |
| | 10 | Krystol ™ 550 | | | | | |
| | 8 | Escorez ™ 5380 | | | | | |
| | 24 | Escorez ™ 5400 | | | | | |
| | 8 | Oppera ™ PR 100N | | | | | |
| | 0.2 | Irganox ™1010 | | | | | |

TABLE 5-continued

| Adhesive Formulation (wt % Adhesive) | Softening Point, (° C.) | Cloud Point, (° C.) | Initial Peel, (g) | Final Peel, (g) | Delta Peel, (g) |
|---|---|---|---|---|---|
| 10D 50 Polymer Blend A<br>10 Krystol ™ 550<br>16 Escorez ™ 5380<br>24 Oppera ™ PR 100N<br>0.2 Irganox ™1010 | 111 | −8 | 72 | 46 | 26 |
| 11D 50 Polymer Blend C<br>10 Krystol ™ 550<br>8 Escorez ™ 5380<br>24 Escorez ™ 5400<br>8 Oppera ™ PR 100N<br>0.2 Irganox ™1010 | 104 | 2 | 98 | 53 (after 24 hrs) | 45 |
| 12D 50 Polymer BlendC<br>10 Krystol ™ 550<br>16 Escorez ™ 5380<br>24 Oppera ™ PR 100N<br>0.2 Irganox ™1010 | 111 | −8 | 98 | 80 (after 24 hrs) | 18 |

TABLE 6

| Adhesive Formulation (wt % of the Adhesive) | Adhesive Viscosity, (cP) | Temperature, (° C.) | Initial Peel, (g) | Final Peel, (g) | Delta Peel, (g) |
|---|---|---|---|---|---|
| 1C 50 Polymer Blend B<br>10 Krystol ™ 550<br>12 Escorez ™ 5400<br>20 Escorez ™ 5340<br>8 Oppera ™ PR 100N<br>0.2 Irganox ™ 1010 | 19,900 | 120 | 116 | 98 | 18 |
| 2C 50 Polymer Blend B<br>10 Krystol ™ 550<br>12 Escorez ™ 5400<br>20 Escorez ™ 5340<br>8 Oppera ™ PR 100N<br>0.2 Irganox ™ 1010 | 8,340 | 140 | 117 | 97 | 20 |
| 3C 50 Polymer Blend B<br>10 Krystol ™ 550<br>12 Escorez ™ 5400<br>20 Escorez ™ 5340<br>8 Oppera ™ PR 100N<br>0.2 Irganox ™ 1010 | 4,170 | 160 | 112 | 115 | 3 |
| 4C Comparative D3166 | 14,517 | 120 | 134 | 115 | 19 |
| 5C Comparative D3166 | 6,210 | 140 | 151 | 109 | 42 |
| 6C Comparative D3166 | 3,065 | 160 | 155 | 119 | 36 |

We claim:

1. An adhesive composition comprising:
   (a) a polymer blend comprising
      a first propylene-based polymer, wherein the first propylene-based polymer is a homopolymer of propylene or a copolymer of propylene and ethylene or a $C_4$ to $C_{10}$ alpha-olefin; and
      a second propylene-based polymer, wherein the second propylene-based polymer is a homopolymer of propylene or a copolymer of propylene and ethylene or a $C_4$ to $C_{10}$ alpha-olefin, wherein the second propylene-based polymer is different than the first propylene-based polymer,
      wherein the polymer blend has a melt viscosity, measured at 190° C. of about 3,000 cP to about 12,000 cP; and
   (b) one or more tackifiers;
      wherein the one or more tackifiers has a softening point as determined by ASTM E-28 of about 80° C. to about 145° C., an aromaticity of about 3 mol % to about 11 mol % aromatic protons, and a Cloud Point of about −10 ° C. to about 15 ° C.,
      wherein the polymer blend is present in the amount of about 50 wt % to about 90 wt % of the adhesive composition.

2. The adhesive composition of claim 1, wherein the polymer blend comprises an ethylene-based polymer selected from the group consisting of ethylene vinyl acetate and a polyethylene.

3. The adhesive composition of claim 2, wherein the ethylene vinyl acetate has about 15 wt % to about 40 wt % vinyl acetate and a melt index of about 30 g/10 min to about 1,000 g/10 min.

4. The adhesive composition of claim 2, wherein the polyethylene has a density of about 0.86 g/cm$^3$ to about 0.9 g/cm$^3$ and a viscosity of about 5 Pa-s to about 200 Pa-s at 177° C.

5. The adhesive composition of claim 1, wherein the polymer blend comprises a third propylene-based polymer;
   wherein the third propylene-based polymer is a propylene homopolymer having a viscosity of about 3,000 cP to about 12,000 cP at 190° C. and a softening point, as determined by ISO 4625, of about 70° C. to about 130° C.

6. The adhesive composition of claim 1, wherein the change in peel strength over 2 months, as determined by ASTM D-903, is less than about 20%.

7. The adhesive composition of claim 1, wherein the initial peel, as determined by ASTM D-903, does not change by more than about 5% when the melt viscosity of the adhesive composition changes by about 400%.

8. The adhesive composition of claim 1, wherein the polymer blend has a DSC crystallinity of about 10 J/g to about 30 J/g.

9. The adhesive composition of claim 1, wherein the composition is free of a wax.

10. The adhesive composition of claim 1, further comprising an antioxidant and a plasticizer.

11. The adhesive composition of claim 1, wherein the tackifier is present in the amount of about 10 wt % to about 50 wt %.

12. An article comprising the adhesive composition of claim 1.

13. An article of claim 12, wherein the adhesive composition adheres one or more substrates, and wherein at least one of the one or more substrates comprises paper, cardboard, plastic, nonwoven, metal, wood, other natural fiber based material, or combinations thereof.

14. A process to prepare an adhesive composition, comprising blending
(a) a polymer blend comprising
a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin;
wherein the second propylene-based polymer is different than the first propylene-based polymer;
wherein the polymer blend has a melt viscosity, measured at 190° C. of about 3,000 cP to about 12,000 cP;
wherein the polymer blend is present in the amount of about 50 wt % to about 90 wt % of the adhesive composition; and
(b) one or more tackifiers;
wherein the one or more tackifiers has a softening point as determined by ASTM E-28 of about 80° C. to about 145° C., an aromaticity of about 3 mol % to about 11 mol % aromatic protons, and a Cloud Point of about −10° C. to about 15° C.

* * * * *